United States Patent [19]

Ross et al.

[11] Patent Number: 4,637,058

[45] Date of Patent: Jan. 13, 1987

[54] LOCATION OF OBJECTS WITHOUT USE OF SALIENT FEATURES

[75] Inventors: Joseph Ross, Fort Salonga; Richard Schmidt, Huntington, both of N.Y.

[73] Assignee: Robotic Vision Systems, Inc., Hauppauge, N.Y.

[21] Appl. No.: 649,687

[22] Filed: Sep. 12, 1984

[51] Int. Cl.$^4$ .......................... G06K 9/20; G06K 9/52
[52] U.S. Cl. ...................................... 382/48; 382/34; 382/44
[58] Field of Search .............................. 382/34, 44, 48; 358/107

[56] References Cited

U.S. PATENT DOCUMENTS

| | | | |
|---|---|---|---|
| 4,443,855 | 4/1984 | Bishop et al. | 382/48 |
| 4,484,348 | 11/1984 | Shizuno | 382/48 |
| 4,547,800 | 10/1985 | Masaki | 358/107 |
| 4,555,801 | 11/1985 | Miyagawa et al. | 382/44 |
| 4,566,126 | 1/1986 | Miyagawa et al. | 382/48 |

Primary Examiner—Howard A. Birmiel
Attorney, Agent, or Firm—Max Fogiel

[57] ABSTRACT

The physical location of a surface in six degrees of freedom relative to the nominal location of a nominal surface is uniquely defined automatically by a measurement system provided with a processing unit, if sufficient asymmetric curvature exists in the surface to uniquely locate three points on the surface. Useful in inspection and material handling applications, a master model of the surface with a known location is defined. Two points are selected on the surface and then a plane is passed through the points, preferably perpendicular to the surface if no edge is present. Then a third point is selected along the curve of intersection so that the three points form a unique triangular template that locates the points along the curve. If the three points are on a sharp edge of the surface this may be adequate information. Otherwise a plane is passed through one of the points (or two planes, one through each of the two points), preferably perpendicular to the first plane, and two additional points are selected along the curve of intersection so that the three points form a unique triangular template that locates the points in the direction orthogonal to the direction of the first curve. Thus, depending on the surface curvature, as few as three points are chosen and measurements made in those relative locations on the surface to be located. By fitting the measured data to the nominal model surface, the location of the surface relative to the model can be determined.

2 Claims, 7 Drawing Figures

LOCATION OF OBJECTS WITHOUT USE OF SALIENT FEATURES

BACKGROUND OF THE INVENTION

In the application of vision guidance to robotic manufacturing, the vision system must often look for objects similar to a reference object which it has been taught to recognize. The object may differ from the reference by manufacturing tolerances and the vision recognition method must be tolerant of these differences. Accurate positioning of the part is expensive, so the value of the vision system increases as its tolerance for placement errors increase. The task of the vision system then becomes one of finding the object and informing the robot of its exact position so that the robot may perform its task of picking up the object, welding it, drilling holes in it, inserting parts into it, etc.

Often both position and orientation of the object must be determined which involves all six degrees of freedom of any physical object; three values of position and three values of angle. Knowing position and orientation of the object relative to the end of the robot arm enables the robot to position and orient a tool correctly relative to the object, which is the goal of vision guidance.

An object may have holes, corners, or other salient features which allow the vision guided robot system to readily determine the values of the six degrees of freedom of an object using techniques of the prior art. When such features are not present, the problem of determining the six degrees of freedom becomes difficult and may be impossible such as on objects possessing cylindrical, spherical or translational symmetry. Fortunately, the symmetry which eliminates the ability to determine orientation about a rotational axis of symmetry also usually eliminates the need to determine that orientation. Where asymmetry exists, orientation can be determined and the present invention describes a method for accomplishing this task.

SUMMARY OF THE INVENTION

It is an object of the present invention to overcome the prior-art disadvantages.

More particularly, it is an object of the present invention to provide a method for vision systems (or any measurement system) to determine the orientation and position of an object in some frame of measurement reference when salient features are not present.

In keeping with this object, and with still others which will become apparent as the description proceeds, one aspect of the invention resides in a method of fitting a unique template of points from a master object to surface patches measured in corresponding locations on the object whose location is to be determined; the surface patch areas being large enough to encompass all anticipated errors.

A second aspect of the invention reverses the procedure and resides in a method of measuring just a few points that form a unique location template on the surface of the object to be located and fitting those points to the master object.

In each case the deviation of the template from the nominal data is an indication of the deviation of the object from the noxinal location. In the first aspect it is a direct measurement, in the second the values obtained are the negative of the values sought (e.g., if the object is 1" left of the nominal it will be found that the template fits when moved 1" to the right). Where the measured object is not exactly the same as the master object, a location providing a minimum deviation from the nominal location can be provided.

The invention will hereafter be described with reference to an exemplary embodiment, as illustrated in the drawings. However, it is to be understood that this embodiment is illustrated and described for the purpose of information only, and that nothing therein is to be considered limiting of any aspect of the invention.

DESCRIPTION OF THE PREFERRED EMBODIMENTS

Figure 1:
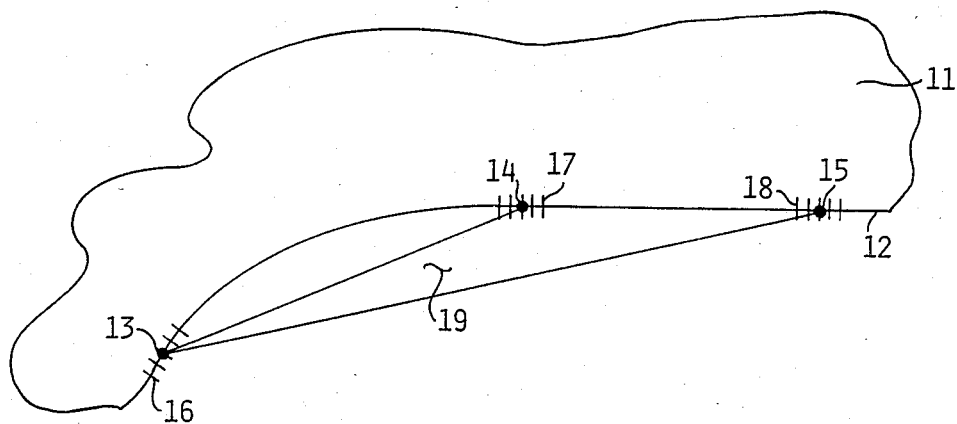
FIG. 1 is a schematic view and illustrates the edge of an object whose position and orientation is to be found with its unique location template.

In FIG. 1, a surface 11 with edge 12 is to be uniquely located in a measurement frame. The shape of edge 12 is known beforehand either as an ideal set of points (or as a mathematical function from which the surface was designed) or from measurement of a master surface (prototype). We shall refer to this as the design data base. As long as edge 12 does not exhibit circular symmetry and is not a straight line, the location of the surface 11 is uniquely defined by edge 12 as follows:

(1) Select three points 13, 14 and 15 on edge 12 from the design data base. The further apart the points are located, the more sensitive to positional errors and the more accurate the results can be made for a given accuracy of measurements. Now measure corresponding points in areas 16, 17 and 18 on edge 12, where the position and length of each area is large enough to encompass all uncertainties in placement of surface 11, measurement uncertainty, and uncertainty in the shape of edge 12. For example, surface 11 may be a manufactured part and the uncertainty in placement can be kept to a small fraction of the length of edge 12 and the uncertainty of edge 12 shape, again small, comes from reproducibility tolerances. Since distances between points on a part are invariant as the part is moved about in the measurement frame of reference, placement errors will not affect the distances between points 13, 14 and 15. In effect, the three points define a template 19 which can uniquely define the location of surface 11. The preceding measurement may consist of any three dimensional measurement, by optical or other means.

(2) Select a point from the measured data in area 16 to represent point 13. Then select a point 14 from the measured data in area 17 at a distance from point 13 equal to the nominal distance between points 13 and 14, as obtained from the design data base. Use interpolation to obtain a point 14 falling between measured points if necessary.

Figure 2:
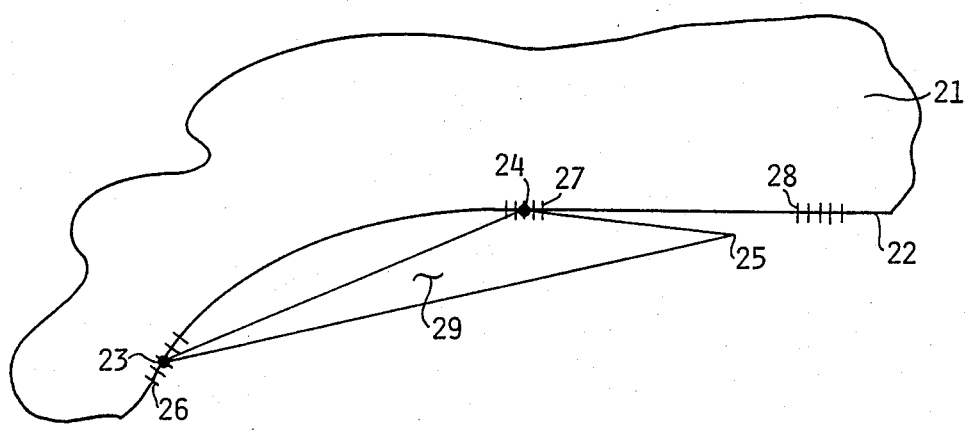
FIG. 2 is a schematic view and illustrates the template placed on measured data of a similar object.

(3) Find the location of point 15 that lies at the nominal distances from points 13 and 14, nearest area 18. Normally, the results will be similar to those shown in FIG. 2 rather than FIG. 1. Where points 23, 24 and 25 correspond to points 13, 14 and 15, respectively, we see that point 25 does not fall exactly on edge 22 as 15 was shown on edge 12. If point 15 does fall on a measured point or interpolated point in area 18, then the location of surface 11 is uniquely determined and step 4) below can be skipped.

(4) Select a new point 23 in area 26 and repeat the process described in step (3) above. If point 25 falls closer to area 28 on edge 22 without sign reversal of the error, then repeat this step selecting another point 23 in the same direction along the edge 22 in area 26. If point 25 falls further from area 28 without sign reversal of the error, then repeat this step selecting another point 23 in the opposite direction along the edge 22 in area 26. A sign reversal of the error indicates the need for a smaller step. Repeat this procedure until point 25 falls within an acceptable error distance from area 28.

(5) Use standard procedures to determine the amount of translation along each measurement reference axis and rotation about those axes that the template 29, formed by points 23, 24, 25, has moved from nominal location 13, 14, 15. This provides the desired answer of the amount of translation and rotation that surface 21 has undergone from the nominal position of surface 11.

Figure 3:
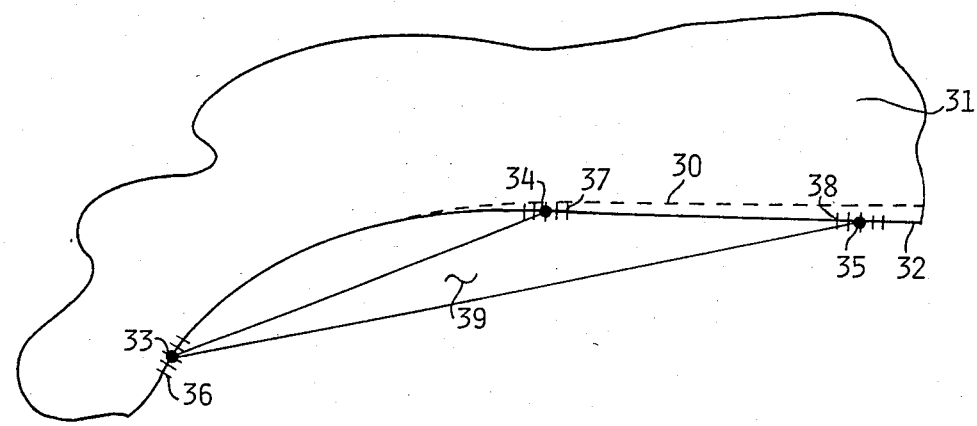
FIG. 3 is a schematic view and illustrates the final template position on the measured object.

FIG. 3 illustrates how a change in shape of edge 12 is accommodated. If dashed curve 30 represents the nominal edge 12 shape and actual edge 32 deviates a small amount from it, then the template 39 formed by points 33, 34, 35 will uniquely position on edge 32 by the above procedure as shown. Thus, surface 31 can be uniquely located within the tolerance of the shape and measurement capability.

The above-described procedure may be reversed. Instead of selecting a three point template 19 from the design data base such as points 13, 14, 15 and fitting them to measured area data sets 16, 17, 18, we can measure just three points such as 33, 34, 35 and fit them to the design data base corresponding areas 16, 17, 18 on edge 12. In similar manner as before the distance between points 33 and 34 can be used to establish corresponding points in areas 16 and 17 from which a third point corresponding to point 35 can be located. The location of point 35 is established by the measured 33 to 35 and 34 to 35 distances. If the location of point 35 does not fall sufficiently close to area 18, then the points selected in areas 16 and 17 would be moved along edge 12, while maintaining the measured distance between them constant, in a direction that reduces the error between point 35 and area 18 to an acceptably small value.

Figure 4:
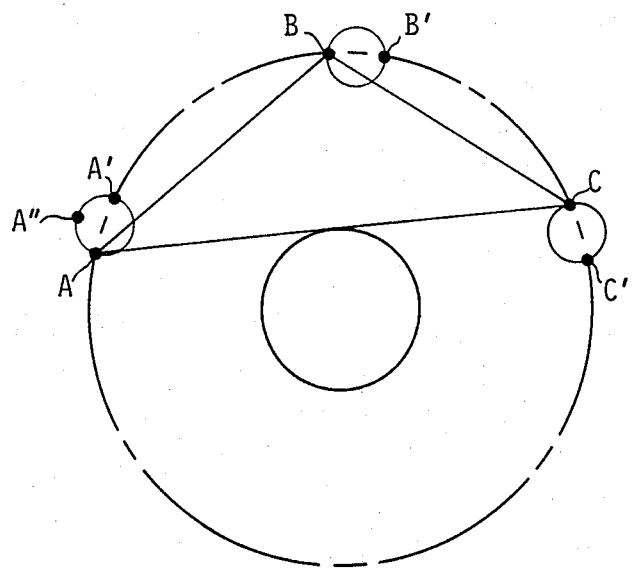
FIG. 4 is a schematic view and illustrates template ambiguity caused by double valued functions.

If the edge 12 of surface 11 approaches circular symmetry, the ability of this method to locate the orientation of surface 11 about the axis of symmetry diminishes, resulting in increasing errors. Double valued functions such as bolt holes arranged in a circular pattern as shown in FIG. 4 can also introduce ambiguity that can result in incorrect location. Care must be taken to avoid selecting a template such as defined by points A, B, C which exhibit circular symmetry with points A', B', C'. By selecting point A" instead of A, the ambiguity can be avoided. Also by examination of the slopes of the edges in the vicinity of the points or curve fitting several points such as A, A", A' the ambiguity can be resolved. The three point template is a minimum amount of information to provide unique location and adding more information, such as local slopes and curve shape, enables the resolution of ambiguity.

So far we have addressed the problem of location of a surface with an edge. The surface does not necessarily have to be planar. The three point template defines a plane. However, the three points may lie on an edge that is any arbitrary spacial curve. If we try to locate the template on a curved surface with no edges in the vicinity of the area of interest, the three points on the surface defining the template, also define a plane which cuts through the surface. A view perpendicular to that plane shows the intersection of the plane and surface as a plane curve with the three point template in contact with it; the same as depicted in FIG. 1 with edge 12 and template 19. Although the same unique locating method as previously described applies within the plane of the template, there may be little change in the shape of the curve as the template plane is moved normal to itself or rotated about an axis perpendicular to the surface. Thus, the surface edge 12 previously described provided an essential constraint on three of the six degrees of freedom (two angle and one translation). To resolve the potential ambiguity without the help of an edge, additional points must be added to our template until sufficient to uniquely locate the template on the surface.

Figure 5A:
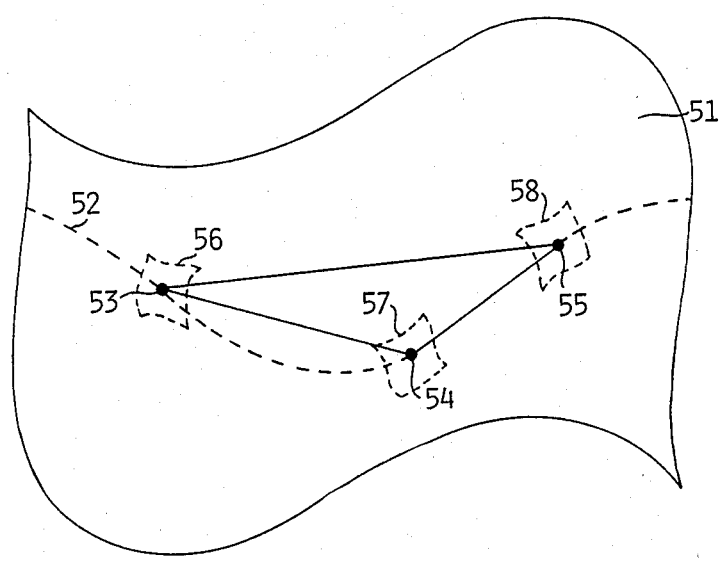
FIG. 5a illustrates the placement of a unique location template on a surface in which the location problem is solved with a three point template.
Figure 5B:
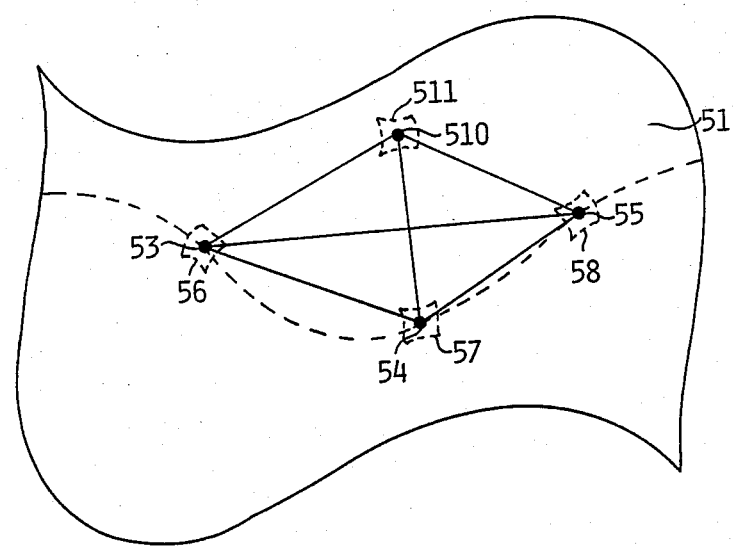
FIG. 5b is similar to FIG. 5a, but solves the location problem with a four point template.
Figure 5C:
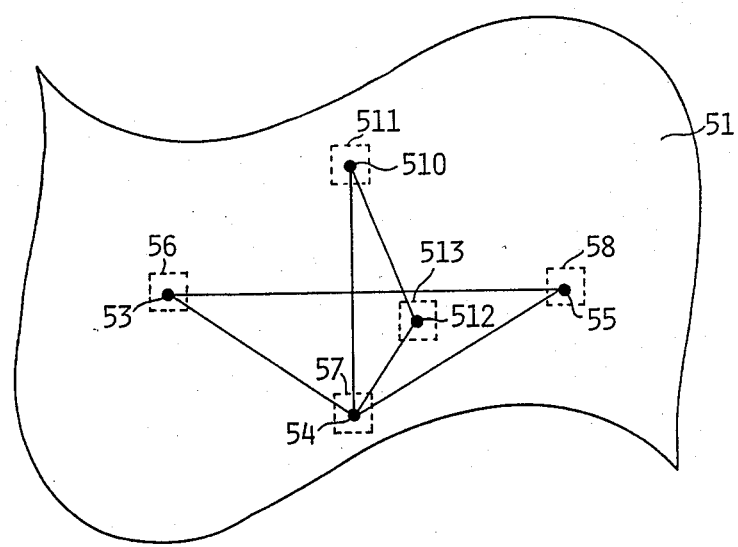
FIG. 5c is similar to FIG. 5b, but solves the location problem with a five point template.

Just as measurement of one or two points on an edge is not sufficient to locate the position of those points along the edge, we may require more than the data in the three point template plane to locate the template in the direction perpendicular to the template. As shown in FIG. 5a, our design data base or the data measured on the surface 51 (subject) to be located must completely describe the master or subject areas 56, 57, 58 which encompass all uncertainties in placement, measurement and shape. We shall treat the case where the design data base defines the areas 56, 57, 58 and it should be recognized that the procedure can be used for the reverse case as was described for location using an edge. If the three points 53, 54, 55 measured on surface 51 can only match one unique set of distances in areas 56, 57, 58 of the design data base within an acceptable tolerance then the location problem is solved with a three point template. If not, then an additional area 511 shown in FIG. 5b, selected in a direction lateral to template 53, 54, 55, must be added to the design data base and an additional point 510 must be measured on subject surface 51. If the four points do not result in a satisfactorily unique location, then a fifth area 513 shown in FIG. 5c must be added to the design data base and a fifth point 512 must be measured on surface 51. It should be now noted that points 54, 510, 512 form a template in a direction lateral to the template formed by points 53, 54, 55. Thus the common point 54 is uniquely located in three degrees of freedom on surface 51 by the five measured points 53, 54, 55, 510, 512 so selected. Again caution must be taken to assure that surface 51 does not possess circular symmetry in the plane of either template for the corresponding three measured template points or the ability to uniquely determine the template location on the surface will be lost. With strong asymmetry, five of the six degrees of freedom of surface 51 will be uniquely established. The sixth degree of freedom, rotation of points 53, 510, 55, 512 about an axis through point 54 will also be uniquely established if three of the four points 53, 510, 55, 512 (e.g., 53, 510, 55) form a template in whose plane the surface 51 possesses strong asymmetry and is not nearly parallel to the plane of template 53, 54, 55

(preferably it should be normal to that plane). If this condition is not satisfied, then the process of selecting areas 511 and 513 lateral to template 53, 54, 55 from point 54 must be repeated for point 53 or 55 to unambiguously locate one of those points as rigorously as point 54. This then defines the sixth degree of freedom.

Smooth surfaces will tend to exhibit circular symmetry (or worse - spherical symmetry) and the templates will show weak uniqueness (insensitivity to small errors) of location. The extreme case is the flat plate which is really part of the surface of a sphere with an infinite radius. A template on a flat featureless plate shows no unique location. As curvature is added to the plate, uniqueness of location can be established from asymmetries in the curvature. The template points must therefore be carefully selected to maximize sensitivity to positional errors.

The use of points in common between templates is not essential but does provide measurement economy. By selecting three orthogonal planes that intersect the surface with two surface points in common between two of the planes, and each of those planes has one surface point in common with the third plane, then only five points (as in FIG. 5c) need be measured to obtain the six degrees of freedom. With no points in common, at least nine points would have to be measured.

The invention has been described and illustrated with reference to exemplary embodiments. It is not to be considered limited thereto, inasmuch as all modifications and variations which might offer themselves are intended to be encompassed within the scope of the appended claims.

What is claimed is:

1. A method for uniquely locating an object based on the asymmetric properties of its surface comprising the steps of: selecting a master object similar to the object whose location is to be determined; determining the number of points and locations upon said master object that form a unique location template with adequate sensitivity to positional error; defining quantitatively said points representative of the master object surface relative to a frame of reference; measuring areas on said object whose location is to be determined, said measured areas being in the relative locations determined to provide a unique location template, the size of the areas and their relative locations describing accurately the object's surface in each of the template point locations over the areas of uncertainty in location; and fitting the location template to said measured surface areas to establish the location of the object.

2. A method for uniquely locating an object based on the asymmetric properties of its surface comprising the steps of: selecting a master object similar to the object whose location is to be determined; defining quantitatively the master object by data points or by equations representative of the surface relative to a frame of reference; determining the number of points and locations upon said master object that form a unique location template with adequate sensitivity to positional error; measuring points on the object to be located, said points being in relative locations for providing a unique location template; and fitting the measured points to the master object surface as described by said quantitative definition step to establish the location of the object.

* * * * *